(12) United States Patent
Frias et al.

(10) Patent No.: US 8,477,226 B2
(45) Date of Patent: Jul. 2, 2013

(54) VARIABLE CHARGE COUPLED DEVICE FOCAL PLANE ARRAY

(75) Inventors: Bron R. Frias, Catonsville, MD (US);
Nathan Bluzer, Rockville, MD (US);
Paul A. Tittel, Columbia, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 345 days.

(21) Appl. No.: 12/730,076

(22) Filed: Mar. 23, 2010

(65) Prior Publication Data

US 2011/0234877 A1    Sep. 29, 2011

(51) Int. Cl.
*H04N 3/14* (2006.01)
*H04N 5/335* (2011.01)
*H01L 27/148* (2006.01)

(52) U.S. Cl.
USPC ............................ 348/311; 348/317; 257/215

(58) Field of Classification Search
USPC .................................. 348/311–324; 257/215
See application file for complete search history.

(56) References Cited

U.S. PATENT DOCUMENTS

| | | | | |
|---|---|---|---|---|
| 4,989,086 A * | 1/1991 | Schaff et al. | | 348/147 |
| 5,773,832 A * | 6/1998 | Sayed et al. | | 250/370.09 |
| 6,633,058 B1 * | 10/2003 | O. et al. | | 257/232 |
| 6,770,860 B1 * | 8/2004 | O | | 250/208.1 |
| 7,034,273 B1 * | 4/2006 | O | | 250/208.1 |
| 7,265,828 B2 * | 9/2007 | Levine | | 356/326 |
| 7,952,633 B2 * | 5/2011 | Brown et al. | | 348/295 |
| 2007/0064135 A1 * | 3/2007 | Brown et al. | | 348/311 |
| 2010/0097505 A1 * | 4/2010 | Meisenzahl | | 348/273 |

OTHER PUBLICATIONS

*Characteristics and use of back-thinned TDI-CCD;* Apr. 2007; 11 pages; Hamamatsu Photonics K.K.—Solid State Division, Hamamatsu City, Japan.

* cited by examiner

*Primary Examiner* — Kelly L Jerabek
(74) *Attorney, Agent, or Firm* — Alston & Bird LLP

(57) ABSTRACT

A charge coupled device imager, which can operate in time delay and integration mode, can be adapted to include variable columns having one or more blocking gates or other barriers that can be independently controlled and used to divide a used portion from an unused portion. The blocking gates may require less power to electrically insulate used from the unused sections. In this regard, an imager's charge handling capacity and dynamic range can be improved, while lowering CCD operating power requirements. Blooming drains can also be included to enhance the functionality of the imager and enable bidirectional imaging capability.

24 Claims, 5 Drawing Sheets

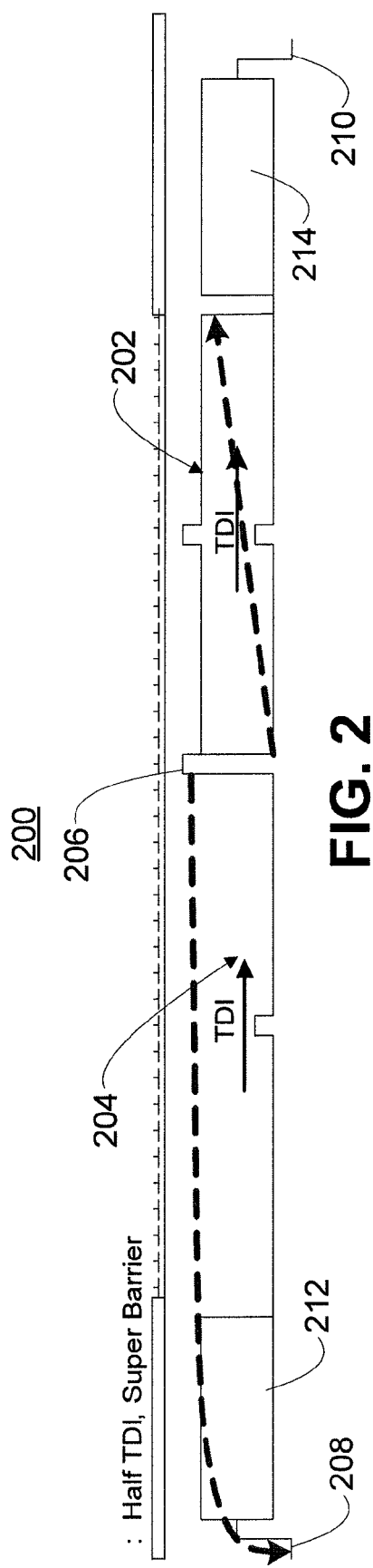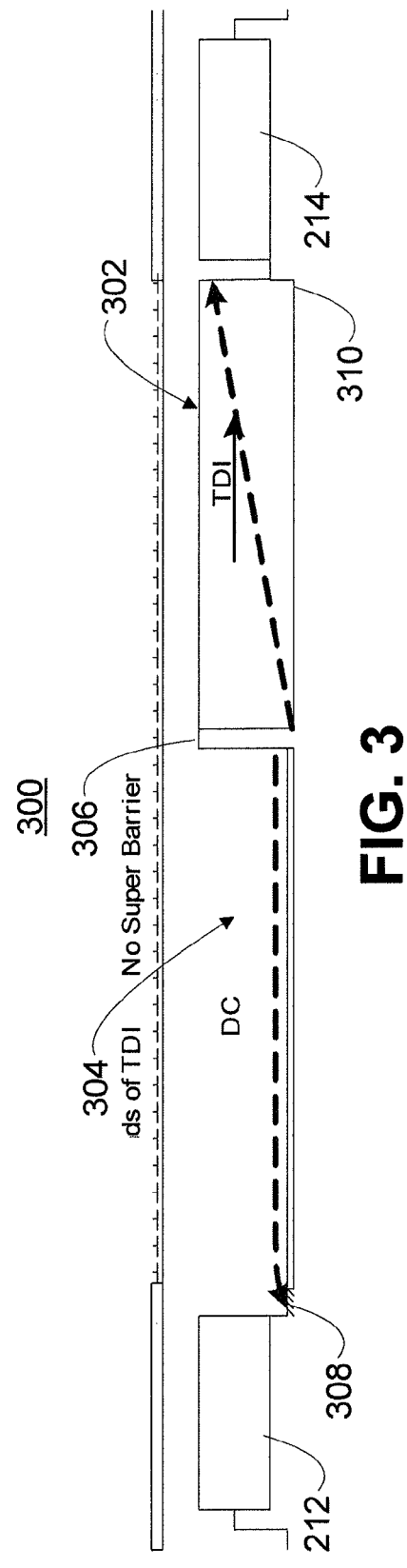

VARIABLE CHARGE COUPLED DEVICE FOCAL PLANE ARRAY

FEDERALLY SPONSORED RESEARCH OR DEVELOPMENT

This invention was made with United States Government support under contract number 30028411 awarded by the United States Air Force. The United States Government has certain rights in the invention.

FIELD

The present invention relates to a charge-coupled device ("CCD") imager that can be configured to operate in a variable time delay and integration ("TDI") mode and, more particularly, to apparatuses, systems, methods, computer readable media and other means for using CCD imagers that increase charge handling capacity and dynamic range while reducing power consumption.

BACKGROUND

CCD imagers are currently used in many applications, including: commercial digital photography, satellite photography, x-ray machines, and other imaging devices. A CCD imager makes use of CCD focal plane(s) and peripheral drive circuitry to form a sensor (or camera).

CCD based sensors utilize the photoelectric effect to produce electric charge signals that are monotonically dependent on wavelength and photon intensity to which the sensor is exposed. The combination of sensor material and optical filters determines the operating bands within which the sensor will generate electrical signals in response to absorbed photons from the scene. The CCD focal plane is divided into pixels and within each pixel electrical charge is photogenerated. Collectively, photogenerated charges in the pixels represent the image data.

A CCD focal plane includes an advantageous property that is absent from photodiode-based focal plane sensors. A photodiode stores signal charges on a capacitor formed by the diode's p-n junctions. A CCD stores signal charges in potential well. This fundamental difference in signal storage can have a tremendous impact when imaging from a moving platform. Specifically, signal charges photogenerated on different photodiodes cannot be efficiently transferred without introducing reset noise. By contrast, signal charges photogenerated in CCD potential wells can be efficiently moved between potential wells without reset noise. Efficient charge movement in CCDs between potential wells can be important for realizing sensors operating from moving platforms.

The issue of image blur should be addressed when imaging from a moving platform. One solution involves using a fast shutter speed, which can avoid blur at the cost of reduced sensitivity. To overcome motion smear issues, CCD sensors are physically and electrically configured to operate in TDI mode, thereby allowing the CCD sensor to capture clear images while the CCD sensor is moving or while the target object is moving. For example, a digital camera on an aircraft or satellite can be configured to take crisp, non-blurry still pictures of the Earth below or something moving over the Earth. As another example, CCD imagers in TDI mode can be used to capture and generate detailed images of articles' barcodes moving at a high velocity down a manufacturing line. TDI mode involves a TDI clock that synchronizes the movement of the CCD sensor and/or target object with the movement of the electrical charges through the CCD wells.

BRIEF SUMMARY

Disclosed herein are apparatus, systems, methods, computer readable media and other means for, among other things, allowing a CCD imager to operate efficiently and to have an enhanced dynamic range utilizing variable TDI mode. For example, the CCD imager can comprise a CCD array that includes a number of TDI stages, which are electrically coupled to operate in the charge domain to form linear TDI columns.

A charge signal in each TDI columns is contained in potential wells and can be transferred efficiently between TDI stages. The column of coupled TDI stages is coupled in the charge domain to be read-out by parallel-input serial-output CCD registers. The parallel-input serial output CCD registers can be located at the top and bottom of the TDI columns array. Inclusion of the parallel-in serial-out CCD registers at the top and bottom of the TDI columns array provides means for bidirectional scan and readout of the TDI columns by the parallel-in serial-out CCD register.

Each TDI column may include, for example, 128 or any other suitable number of TDI stages, and each CCD array may include hundreds, thousands, or any suitable number of TDI columns. The array of TDI columns can be sectioned with at least one blocking gate or other type of barrier. Blocking gates can be ion implanted or non-implanted and be configured to function as barriers that divide the TDI column array into a used and unused TDI imaging section. Electrical signals applied to the blocking (or other type of barrier) gates operate at substantially the same voltage potential as one or more non-blocking stages, located adjacent to the blocking gate in the column. Blocking or non-blocking function is determined by the voltage potential applied to the gate and, in some embodiments, the location of blooming drains intended to prevent charge spill between TDI pixels in the used and unused portions of the TDI column.

The CCD imager can also include a first readout register (sometimes referred to herein as a "top readout register") coupled to the top end of the TDI columns array. The CCD imager can also include a second readout register (sometimes referred to herein as a "bottom readout register") coupled to the bottom end of the TDI columns array. One or more blocking gates and blooming drains may also be included in the CCD imager. For example, a first booming drain (sometimes referred to herein as the "top booming drain") can be disposed near the top of the TDI columns array. Similarly, the TDI column can include a second blooming drain (sometimes referred to herein as the "bottom blooming drain") disposed near the bottom of the TDI columns array. In this manner, the location of the bottom blooming drain can be referred to as being between the top blooming drain and the bottom readout register. In this regard, the top and bottom blooming drains can be located between the top and bottom of the TDI registers without requiring each TDI column to have blooming drain functionality within the TDI column.

In some embodiments, used and unused TDI columns array sections (or portions) of the CCD imager can be independently clocked. For example, when a blocking gate divides the TDI columns array into a top portion and a bottom portions, the top clocks can be dynamically controlled and/or configured to operate at a different or the same frequency than the bottom clocks. Gates for the unused section of the TDI columns array do not have to be clocked and can be operated at an attractive direct current ("DC") voltage.

The relative size of the used and unused TDI columns imaging sections can be adjusted by selecting blocking gates to be activated. Blocking gates can be selected independent from other stages included in the respective TDI column. Inclusion of several blocking gates in the TDI columns array permits incremental adjustment of the relative sizes of the used and unused imaging sections. The incremental adjustment in the variable TDI size is monotonically proportional to the number of blocking gates incorporated in the TDI columns imaging section. The imaging TDI section can include one or more sections of TDI stages that are used to receive light or other types of radiation, and generate isolated electrical charges that represent the image data. The unused TDI section can include one or more sections of TDI stages that may receive radiation and generate electrical charges, but this signal can be discarded into a blooming drain and not used for imaging.

In some embodiments, the used and unused sections of the TDI columns array are determined by two blocking gates and with a blooming drain between them. A blooming drain disposed between the two non-implanted blocking gates helps prevent charge from the unused TDI imaging array section from spilling into the used TDI columns imaging section.

The variable TDI CCD imager in combination with other circuitry, including driver circuitry, can implement a method for controlling the direction of charge flow in the used and unused TDI sections. For example, embodiments may include directing photogenerated charge signal in the unused TDI imaging section into a blooming drain. In this manner, the flow of unused electrical charges can comprising: generating a flow of unused electrical charges; blocking, with blocking gate operating at substantially the same the same voltage potential as gate being used for imaging, the flow of the unused electrical charges; and attracting the flow of the unused electrical charges towards a blooming drain. The method can further comprise using clocks to facilitate the flow of photogenerated charge used for imaging away from the blocking gate and towards the readout register.

The method can further comprise applying different clocking to the used and unused TDI sections, which are separated by one or more blocking gates. In some embodiments, two blocking gates can be used with a blooming drain between them. The clocks applied to the unused TDI section can be all attractive to allow the photogenerated charge to be removed through each TDI column's blooming drain. The unused TDI section can also be clocked by adjusting the potential on the blooming blocking gate to prevent charge spill over from the used TDI section.

Some embodiments may also provide for a computerized storage, such as a nontransitory computer readable storage medium, which includes instructions for generating the clocking waveforms to operate the used and unused sections of the variable TDI CCD imager. When executed, digitally stored waveforms can be used to control the relative size of the used and unused TDI sections and the flow of photogenerated charge in the used and unused TDI sections. The stored instructions varying the relative size of the used and unused TDI sections; the waveforms for operating the used and unused TDI sections; waveforms for operating the blocking and blooming drains; and the top and bottom readout registers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 shows a sectioned column of stages adapted with an implanted barrier;

FIG. 3 shows a sectioned column of stages adapted with a non-implanted barrier in accordance with some embodiments;

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements.

Embodiments discussed herein provide, among other things, apparatuses, systems, methods, computer readable media and other means for electronically selecting the TDI length in a scanning CCD imager system. Scanning CCD imagers systems according to variable ambient lighting conditions. This requirement can be satisfied by varying the number of TDI stages according to the ambient lighting conditions.

For mechanical scanning efficiency reasons, the imager can be bidirectional. Bidirectionality can be achieved by making the CCD array bidirectional. In this regard, each array of TDI imaging columns can be clocked up or down, into a parallel-in serial-out CCD multiplexer that are located at the top and bottom of the array of TDI imaging columns. A TDI column of stages can be oriented in any manner in space, despite a first end of the column sometimes being referred to herein as the "top end" and the second end of the column sometimes being referred to herein as the "bottom end." One skilled in the art would appreciate that this nomenclature is not being used to imply a particular orientation of the columns of stages in space and is only being used herein to avoid over complicating the discussion. Similarly, other components discussed herein are sometimes referred to using modifiers such as "top", "bottom", "vertical", "up" and "down", which are likewise meant only to avoid overcomplicating the discussion and are not meant to limit the disclosure in any manner.

Figure 1:
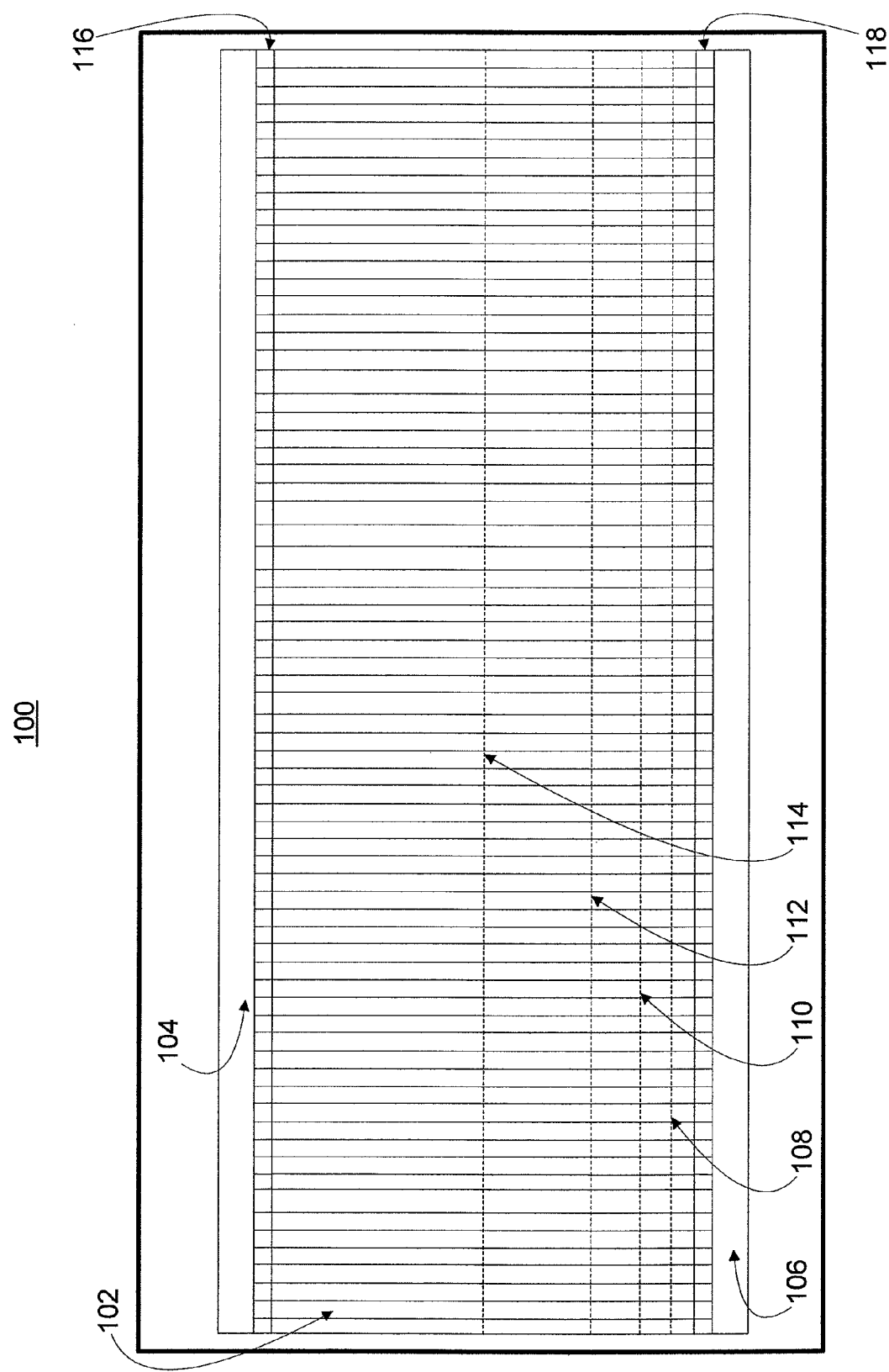
FIG. 1 shows charge coupled device array.

FIG. 1 shows an exemplary apparatus configured to implement bidirectional TDI imaging. FIG. 1 shows CCD imager 100. CCD imager 100 can be configured to vary the number of TDI stages used for imaging. CCD imager 100 includes a bidirectional, TDI columns array, referred to herein as TDI columns array 102. The TDI columns array 102 is shown in FIG. 1 as being vertically oriented and can be clocked in the up or down direction. CCD imager 100 also includes top readout registers 104 and bottom readout registers 106, which may include any type of parallel-in serial-out CCD readout registers configured to receive electrical charges representing imaging data. The electrical charges can be photogenerated within the TDI stages located in variable TDI columns array 102. For example, when a column (or portion thereof) is clocked up, top readout registers 104 can receive the electrical charges representing imaging data. As another example, when a column (or portion thereof) is clocked down, bottom readout registers 106 can receive the imaging data.

Each column can comprise a number of TDI stages. For example, each column may include 128 stages. Each TDI stage can utilize the photoelectric effect to generate an electrical charge signal when exposed to photo-radiation, wherein the quantity of the charge represents the amount of photo-radiation to which the sensor was exposed. Each TDI stage also comprises a potential well for storing the photogenerated charge. The potential wells in each TDI stage can be controlled by CCD clocking gates and can be adapted to efficiently transfer charge between adjacent TDI stages. The CCD potential wells can be formed, for example, in a depletion region of a doped semiconductor material.

Each TDI column can be divided into sections, where each section can includes one or more TDI stages. The sections are shown in FIG. 1 as being defined by the location of blocking gates represented by barrier lines 108, 110, 112, and 114. The number of TDI sections used for imaging is adjustable by selecting at least one particular blocking gate within one or more TDI columns. At minimum light conditions the maximum number of TDI stages can be used for better sensitivity. As the level of illumination increases, the number of TDI stages can be varied to prevent saturation. In some exemplary embodiments, the number of TDI stages can be varied so the maximum charge of a CCD potential well is about 50% of full well capacity. In this manner, varying the number of TDI stages with ambient light conditions can maximizes the CCD sensors' dynamic range.

The TDI sections can be, for example, symmetrical about the TDI column's center. In some embodiments, each half of the TDI column can be further divided into a number of TDI-enabled sections. For example, a column can each include 128 stages, and each half can be divided into five separate sections. Each of the five sections can include the same or different amounts of TDI stages. For example, the smallest section may include 8 TDI stages, thereby causing the minimum number of selectable TDI stages to be 8. (As used herein "XTDI" can represent a section having "X" number of TDI stages. For example, a section having 8 TDI stages is sometimes represented herein as "8TDI"). The other sections of the TDI half column can be, for example, 8TDI, 16TDI and 32TDI. One skilled in the art would appreciate that a column may be sectioned in any manner.

For example, in other embodiments, the TDI sections may be combined incrementally or otherwise to utilize more stages than included in the smallest TDI section or fewer TDI stages than all the sections combined. For example, when a 128 stage column is divided as shown in FIG. 1, namely into sections of 8TDI, 8TDI, 16TDI, 32TDI and 64TDI, 16 stages can be utilized for imaging by combining both of the 8TDI sections (8TDI+8TDI=16TDI). This may be achieved by activating the blocking gates represented by barrier line 110, but not activating the blocking gates represented by barrier line 108. To utilize 32 stages for imaging, the smallest three TDI sections can be combined by activating the blocking gates represented by barrier line 112 (8TDI+8TDI+16TDI=32TDI); for 64TDI stage imaging, the smallest four TDI sections can be combined by activating the blocking gates represented by barrier line 114 (8TDI+8TDI+16TDI+32TDI=64TDI); and for a 128TDI stage imaging, all the TDI sections can be combined by not activating any of the blocking gates represented by the barrier lines (8TDI+8TDI+16TDI+32TDI+64TDI=128TDI).

In some embodiments, the mechanized combining of TDI sections can be achieved by using one or more different CCD arrays. Each one of the CCD arrays may incorporate barriers (as represented in FIG. 1 by barrier lines 108, 110, 112 and 114) that can be activated to section TDI column image array 102 into a used portion and an unused portion, where the used portion of the TDI array is used for imaging and the unused portion is not. It should be noted that the CCD sensor can be made to operate with holes or electrons, provided, e.g., the fabrication and CCD clocking voltages are properly adjusted. As used herein a "CCD array element" and "array element" refers to any type of element of a CCD array component, such as, for example a TDI stage, an implanted barrier, non-implanted barrier, and a blooming drain. For example, an implanted barrier or barriers can be disposed between each of the different TDI sections. The barriers can be used to separate and select the sections from which image data is to be generated. An implanted barrier, as referred to herein, includes a stage that has been implanted with a positive ion (such as Boron positive ion) and can maintain a higher voltage potential, as compared to the ion voltage potential of imaging and/or non-imaging stages in the column.

For example, FIG. 2 shows TDI column 200 as including imaging sections 202, which are electrically divided from unused sections 204 by implanted barrier 206. Implanted barrier 206 can be activated in response to receiving a blocking voltage signal, wherein the blocking voltage shifts the voltage potential of implanted barrier 206 higher than the imaging and unused TDI stages. In this regard, FIG. 2 shows implanted barrier 206, having a potential that is 2 volts higher than unused sections 204 and imaging sections 202. The higher voltage potential of implanted barrier 206 enables implanted barrier 206 to block the charge generated by uncombined section 204's sensor array from flowing to imaging section 202.

Unlike other TDI stages that are not configured to block the flow of electrical charges, blocking gates (including implanted and non-implanted barriers) can be independently electrically coupled to driver circuitry (not shown) or other component that can control the blocking gate. The blocking gate can be activated, for example, by applying a DC blocking voltage signal to the blocking gate. The blocking gate can then remain in a static blocking state, preventing a charge from being transferred across that blocking gate while the blocking voltage signal is being supplied. Implanted blocking gates, unlike non-implanted blocking gates and other types of non-implanted barriers, utilize relatively higher operating clocking voltages to compensate for the voltage shift used to form the implanted potential barrier (e.g., the 2 volt implanted barrier) than the surrounding stages. The higher operating clocking voltages required with implanted blocking barriers has a disadvantage when minimum operating power is an important metric.

The functionality of the implanted blocking barrier 206 can be improved by, for example, including a resetable floating diode 208 to enable the removal of any electrical charge photogenerated in the unused TDI section 204. Resetable floating diode 208 can be configured to attract the charges in the unused TDI sections 204, thereby preventing flow of charges from the unused TDI section through implanted barrier 206 and into the used imaging sections 202. To enable bidirectional TDI, resetable floating diode 210 can be located at the top and bottom ends of the TDI column 200. As shown in FIG. 2, resetable floating diodes 208 and 210 can be disposed outside of readout registers 212 and 214, respectively. Readout registers 212 and 214 may be, for example, parallel-to-serial CCD multiplexers. Readout register 212 may be one of top readout registers 104, and readout register 214 may be one of bottom readout registers 106 (or vice-versa, depending on the orientation of TDI columns array 200 within TDI columns array 102). When implanted barrier 206 is active (as shown in FIG. 2), the charge packets produced in the imaging TDI array section 202 can be transferred to readout register 214 coupled in the charge domain to each TDI column 200.

The dashed-arrow lines shown in the drawings represent the flow of electrical charges through the used and unused TDI sections. For example, in FIG. 2, the electrical charges generated by unused sections 204 flow away from implanted barrier 206, into readout register 212 and into resetable floating diode 208. As another example, the isolated electrical charges of imaging sections 202 is clocked by the action of the TDI CCD away from implanted barrier 206 towards readout register 214.

One drawback with the approach of FIG. 2 for some applications is that it can cause a reduction in the charge handling capacity of the TDI mode. The reduction becomes relatively more serious at lower CCD clocking voltages. For example, with 10 volt CCD clock swings, an additional two volt barrier reduces the charge handling capacity of the CCD by 20%. Because of power issues, the stages' clocking voltages are being reduced to 5 volts and possibly as low as 3.3 volts; possibly lower. The reduced CCD clock voltage swings cause the charge capacity of the stages to be reduced by 45% (for 5 volts) or 60% (for 3.3 volts). While the approach of FIG. 2 is valuable in that it provides for variable TDI imaging, such large voltage reductions may adversely effect the implementation of variable TDI functionality for some applications. The adverse affects for some applications can include limited blooming, charge capacity and higher operating power.

The approach of FIG. 2 may also be improved for some applications by enhancing the CCD's capacity to handle large sensor charges while reducing CCD operational power requirements. Some other embodiments discussed herein provide such benefits when implementing variable TDI functionality. Among other things, embodiments discussed herein provide for variable scanning TDI imaging without sacrificing charge capacity, while lowering power consumption.

Another potential issue that may arise when using the approach of FIG. 2 is related to the blooming margin between imaging sections 202 and unused sections 204. The blooming margin may be limited to, e.g., 2 volts, and fixed pattern ground bounce may reduce this level to even smaller blooming margins. Experiments reveal that when the blooming margin is sufficiently small, it may increase the risk of image streaks that occurs when the charge from the blocked (unused) TDI section spills over the barrier into the imaging TDI section. Given the aforementioned experimental evidence, and the benefits that may be realized by reducing the CCD clocking voltages, embodiments discussed herein provide improvements related to reducing CCD clocking voltages and increasing charge handling capacity.

Some embodiments that provide the aforementioned benefits involve a clocking and a blooming drain to prevent or at least limit charges, generated in the blocked TDI section, from spilling into the imaging TDI section(s). As shown in FIG. 1, each column can include top and bottom readout sections, namely top readout registers 104 and bottom readout registers 106. During TDI operation of a portion of a column being used for imaging, either a top readout register 104 is used for output readout, or a bottom read out register 106 is used for output readout. As discussed herein, a blooming drain can be disposed at the opposite end of the TDI columns array, as shown in FIG. 1 by top blooming drains 116 and bottom blooming drains 118, to assist by attracting charge away from the blocking gate. For example, if a top readout register 104 is used for a column's output readout, the column's bottom blooming drain 118 can be used to remove charges from the bottom portions unused TDI imaging section. As another example, if a bottom readout register 106 is used for a TDI column's output readout, the TDI column's top blooming drain 116 can be used to remove charges from the unused TDI imaging section. Blocking the flow of charge from the unused TDI section into the used TDI section can be further facilitated by making one or more of the clocks applied to the unused TDI section a barrier. Causing all the clocks in the unused TDI section accepting is an alternative approach that will benefit some applications by helping prevent charge spill over from the unused TDI into the used TDI section. Placing the clocks of the unused TDI imaging section into accepting mode can help facilitate the flow of non-imaging charges away from the blocking gate to the appropriate blooming drain.

Forming a blocking barrier without ion implantation provides a solution consistent with increased charge handling capacity and decreased operating power. This solution can be implemented with different clocking in the used and unused TDI sections and/or a blooming drain at the end of the unused TDI section. FIG. 3 shows column 300 consistent with such a solution. Column 300 is constructed to include a barrier that operates at the same (or substantially the same) voltage potential as the TDI stages included in the imaging section(s) and/or non-imaging section(s). TDI Column 300 may be included in a variable TDI CCD imaging array (such as variable CCD array 102 of FIG. 1). Unlike TDI column 200, TDI column 300 is shown as being adapted to block and direct the flow electrical charge without avoid employing an implanted barrier. Instead, TDI column 300 is shown as employing a barrier, namely gate 306, that operate at substantially the same voltage potential as the non-blocking gate(s) of TDI column 300. For example, gate 306 located between imaging section 302 and unused TDI section 304 is shown in FIG. 3 as a non-implanted blocking barrier. Gate 306 can be used by the CCD driver circuitry to produce an electrical barrier between imaging TDI section 302 and unused TDI section 304, even though the potential of gate 306 is the same or substantially the same as the potential of imaging section 302's clocked stages as shown in FIG. 3.

FIG. 3 also shows imaging section 302 being clocked from left to right. Unused TDI section 304 is not clocked (while not being used for imaging), and all its stages enter an electrically attractive mode to form a conductive path from their sensors to blooming drain 308. Driver circuitry (not shown), which can also control the blocking voltage signal supplied to gate 306, can place the stages of unused TDI section 304 in the electrically attractive mode, thereby further electrically insulating the non-imaging stages from the imaging stages of imaging section 302.

Blooming drain 308 is shown in FIG. 3 as being formed in TDI column 300 and disposed adjacent to the parallel-to-serial readout CCD registers, corresponding to readout register 212. Blooming drain 308 may be one of top blooming drains 116 shown in FIG. 1, and blooming drain 310 may be one of bottom blooming drains 118 shown in FIG. 1 (or vice-versa, depending on the orientation of TDI column 300 within TDI columns array 102). When the blooming drain 308 is made attractive, charge generated by unused TDI section 304 is removed by blooming drain 308. Because imaging section 302 is being used to generate image data, blooming drain 310 is disabled.

The dashed-arrow lines shown in FIG. 3 represent the flow of electrical charges through imaging section 302 and unused TDI section 304. In this regard, the electrical charges generated in the unused TDI section 304 remain at a low potential, due to the clocking voltages applied to the TDI stages being placed in an attractive state, and charge signal flows away from gate 306 into drain 308. As another example, the isolated electrical charges of imaging section 302 flow away from gate 306 by the actions of the TDI stages towards readout register 214, because blooming drain 310 is disabled.

Figure 4:
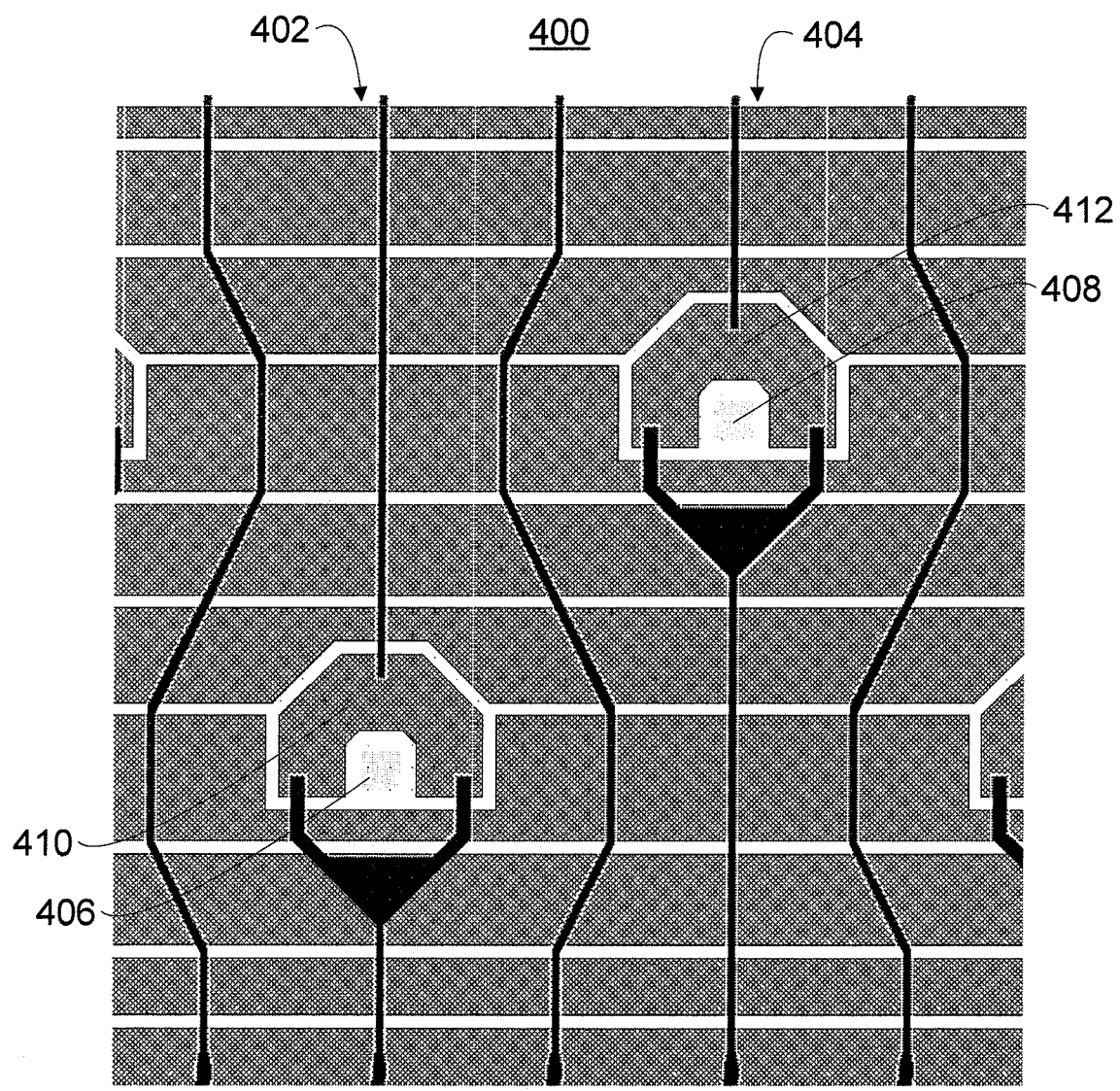
FIG. 4 shows two blooming drains located within two parallel columns included in a CCD array.

FIG. 4 shows array portion 400 which includes a detailed view of blooming drains 406 and 408 that may be incorporated into one end of columns 402 and 404. In this regard, blooming drains 406 and 408 can be located at the top (or bottom) end of each column 402 and column 404 respectively. Gate 410, shown around drain 406, and gate 412, shown around drain 408, are shown as being semicircular in shape. One skilled in the art would appreciate that other shapes could be used. Gates 410 and 412 can also be independently controlled by the CCD driver circuitry. For example, blooming drains 406 and 408 can be turned ON with gates 410 and 412, respectively, to drain charges from the columns 402 and 404, which gates 410 and 412 respectively straddle.

Figure 5:
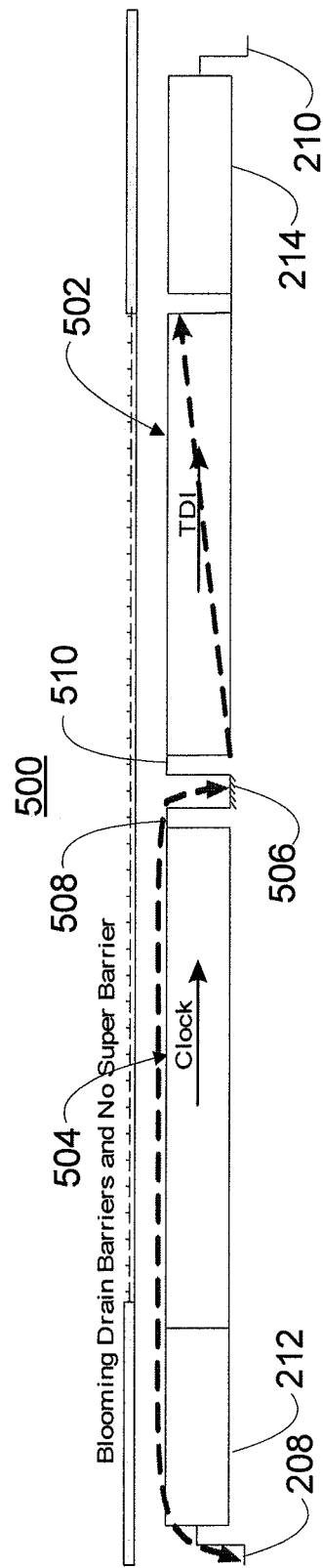
FIG. 5 shows a sectioned column of stages adapted with non-implanted barriers having a blooming drain in between the non-implanted barriers in accordance with some embodiments.

FIG. 5 shows column 500, which represents a a variable TDI column in a CCD imaging array (such as variable TDI columns array 102 in CCD imager 100 in FIG. 1). Like the configuration of column 300, column 500 omits an implanted blocking gate between imaging TDI section 502 and unused TDI section 504. While column 500 is likely to require more area (as compared to column 300) and, therefore, have a larger footprint in the imaging array, embodiments in accordance with FIG. 5 can help simplify the clocking of the TDI column 500. Approaches in accordance with column 500 can include blooming drains being disposed in other places within a column. For example, rather than or in addition to the blooming drains being located at the top and/or bottom of each column (outside the registers as shown in FIG. 2 or inside the registers as shown in FIGS. 3 and 4), one or more blooming drains can placed between each section of TDI stages. In this regard, imaging TDI section 502 can be a first section, while unused TDI section 504 can be a second section. Blooming drain 506 can then be integrated between imaging TDI section 502 and unused TDI section 504.

Two blocking gates, namely gate 508 and gate 510, can be included and be disposed adjacent to blooming drain 506. Gates 508 and 510 can function as blocking gates between imaging TDI section 502, unused TDI section 504, and/or other TDI sections. Gates 508 and 510, similar to other array elements discussed herein, can also be coated with a material that acts as a light shield that blocks one or more types of wavelengths of energy. Gates 508 and 510 are shown in FIG. 5 as being non-implanted barriers that insulate imaging TDI section 502 from unused TDI section 504, despite having the same (or substantially the same) potential as clocked imaging TDI section 502 and unused TDI section 504.

The charge generated by the sensors of unused TDI section 504 can be blocked from the used TDI section 502 by using gate 510 and removed with blooming drain 506, when gate 508 is made non-blocking. Imaging TDI section 502 can be clocked normally and/or otherwise independently of the operation of unused TDI section 504 (and/or other sections that may be incorporated in the TDI CCD imaging array). In this regard, imaging TDI section 502 can be read out through a parallel-to-serial CCD multiplexer via readout register 214.

The dashed-arrow lines shown in FIG. 5 represent the flow of electrical charges through imaging TDI section 502 and unused TDI section 504. In this regard, the electrical charges generated by unused TDI section 504 are at a higher potential and flow away from gate 510 towards the parallel-in serial-out CCD register 214 by the action of the TDI stages in the used TDI imaging section.

TDI columns 300 and 500 have been formulated for realizing a variable TDI scanning focal plane array. By combining clocking waveforms and blooming drain structures to prevent charge spilling from the unused (or blocked) TDI section into the imaging TDI section. As such, apparatuses, systems, computer readable media and methods implementing the above discussed embodiments may improve over previous approaches by improving charge handling capacity and dynamic range. Additionally, apparatuses, systems, computer readable media and methods implementing the above discussed embodiments can lower CCD clock voltages needed for lower operating power.

Methods and other processes may be implemented based on instructions stored on a nontransitory computer readable medium, including random access memory, read only memory, flash memory, any other type of storage device, or combination thereof (As used herein, "nontransitory computer readable medium" refers to a physical storage medium and can be differentiated from a "computer-readable transmission," which refers to an electromagnetic signal.) For example, according to some exemplary embodiments of the present invention, one or more processors (including, e.g., CCD driver circuitry) can be included that operate under control of a computer program product comprising the nontransitory computer readable medium having program code stored thereon. In this regard, the computer program product is an article of manufacture that includes instruction means which can implement the functions described herein.

For example, nontransitory computer readable media can be configured to store firmware, one or more application programs, and/or other software, which include instructions and other computer-readable program code portions that can be executed to control a CCD and implement various TDI and other method steps, some examples of which are discussed herein. As such, a series of computer-readable program code portions are embodied in the computer program product and can be used, with the computer or other programmable apparatus, to produce a computer-implemented process.

As will be appreciated, any such computer program instructions and/or other type of code may be loaded onto a computer or other programmable apparatus's circuitry from the computer program product, to produce a machine, such that the code portions that execute on the machine create the means for implementing various functions, including those described herein. In this regard, a number of exemplary methods and other processes are discussed herein.

Figure 6:
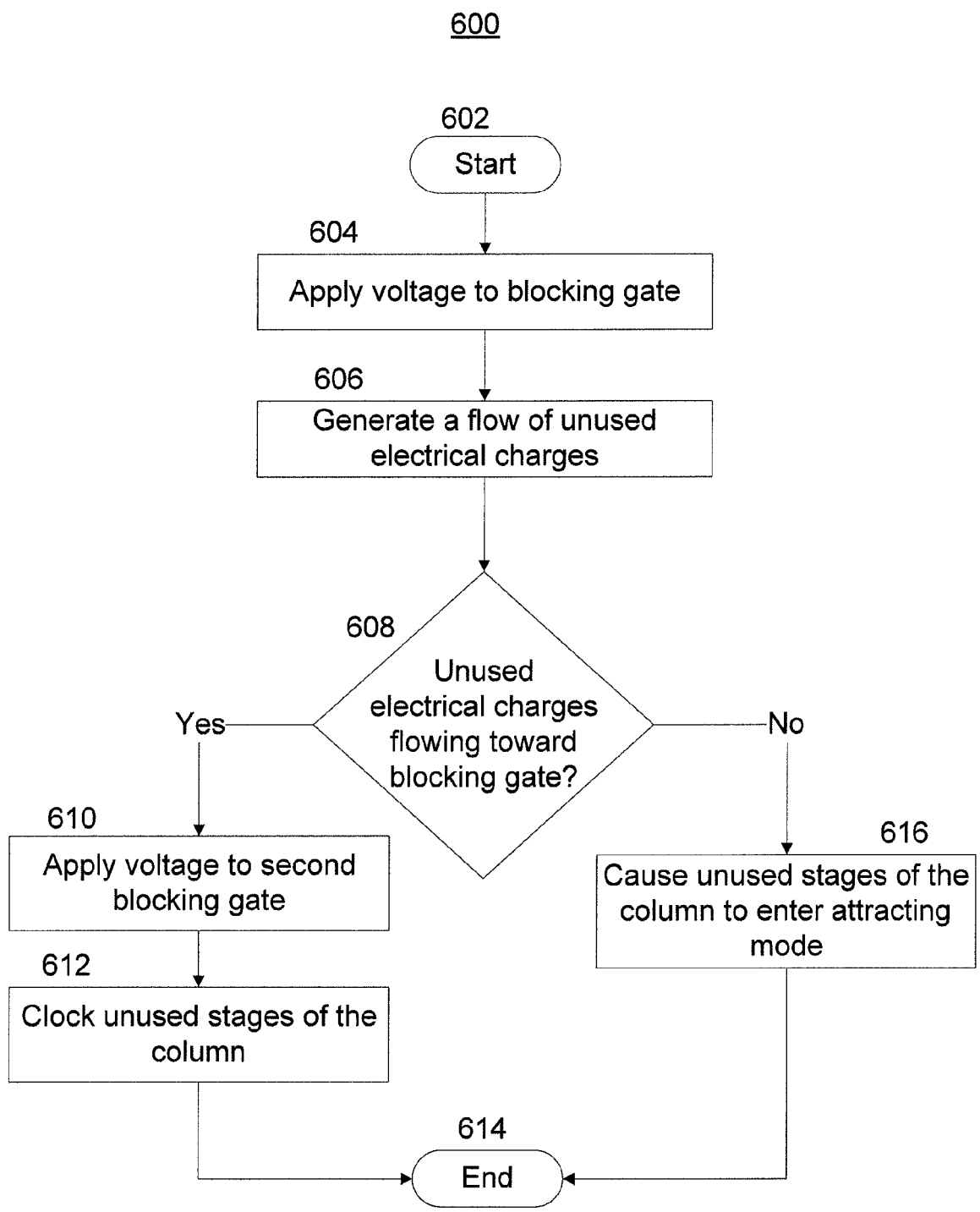
FIG. 6 shows a process that may be implemented by charge coupled devices in accordance with some embodiments.

For example, one method in accordance with some embodiments of the present invention is shown in FIG. 6. Process 600 starts at 602 and proceeds to 604 at which a voltage is applied to a blocking gate, creating an electrical barrier and dividing two sections of the TDI CCD column. The barrier may be a non-implanted barrier that is maintained at the same or substantially the same potential as the column's other TDI stages.

At 606, a flow of electrical charges is generated. The flow may begin in response to, for example, one or more blooming drains being activated. In other embodiments, operator 606 may occur before operation 604, or operations 604 and 606 may occur simultaneously. Similarly, other steps discussed herein can occur in various order(s), combined, divided, or otherwise modified without departing from the spirit of the invention.

The flow of unused electrical charges may move toward or away from the blocking gate. If the flow is moving toward the blocking gate, a second voltage can be applied at 610 to a second blocking gate, as shown in FIG. 5. At 612, the unused stages of the TDI column, which are generating the electrical charges, can be clocked. Process 600 then ends at 614.

If the flow is moving away from the blocking gate and toward a readout register, the unused stages can enter an attracting mode at 616. The attracting mode may help enhance the functionality of the blocking gate. Process 600 then ends at 614.

One skilled in the art would realize a number of advantages provided by some of the embodiments discussed herein. For example, imaging from a moving-platform can better address the issue of image blur. While a fast shutter speed does avoid blur, it does so at the unacceptable cost of reduced sensitivity. The need for, and the sensitivity limitations of a fast shutter are overcome with a CCD. In particular, the ability of moving efficiently signal charges in a CCD between potential wells is the basis for realizing dramatically improved sensitivity for operation from a moving platform.

Sensitivity improvements can be obtained using embodiments discussed herein by correlating multiple samples of the same image. Image photons incident on the CCD focal plane photo-generate electrical charge signal in CCD's potential wells. Without CCD, a scanning imager consists of a line array where the line array width spans across the image and motion provides the in-track dimension of the image. A CCD focal plane can allow formation of an x-y array made up of "N" parallel number of line arrays. Each pixel in the line array is a CCD stage and is contiguous to the corresponding pixel in the neighboring line array. The CCD clocking gates are formed so charge can be transferred between contiguous pixels in neighboring line arrays. Thus, the CCD pixels (or stages) located in the contiguous parallel line arrays provide a spatial x-y sample of image. The image sample is according to the number pixels and their size included in the CCD focal plane. Platform motion causes the incident image to move across the CCD focal plane. Image motion across the focal plane normally leads to smear unless a fast shutter is used. This smear can be removed by exploiting the CCD's ability to move signal charges between potential wells. Hence, movement of the photogenerated signal in the CCDs' potential wells can be synchronous with movement of the image across the CCD. Such synchronizing allows multiple image samples and correlation (addition) of multiple image samples to realize a much longer shutter speed. The number of stages or pixels in the scan direction corresponds to the number of concurrent image sample taken by the CCD imager. Multiple image samples are correlated by using Time Delay and Integration ("TDI"). TDI occurs by synchronizing the image motion with motion of the photogenerated signal inside the CCD focal plane.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A charge coupled device comprising:
a column of stages defining a top end and a bottom end, wherein the column includes:
at least one non-blocking gate positioned in the column between the top end and the bottom end, wherein the at least one non-blocking gate is configured to promote charge transfer; and
a plurality of blocking gates positioned in the column between the top end and the bottom end, wherein each blocking gate is configured to selectively promote charge blocking in a blocked state or promote charge transfer in an unblocked state, wherein, in an instance in which one of the plurality of blocking gates defines the blocked state, the column of stages is divided into an unused section and a used section around the blocking gate that defines the blocked state;
a top readout register coupled to the top end of the column of stages; and
a bottom readout register coupled to the bottom end of the column of stages.

2. The charge couple device of claim 1 further comprising:
a top blooming drain located between the top end of the column of stages and the top readout register; and
a bottom blooming drain located between the bottom end of the column of stages and the bottom readout register.

3. The charge coupled device of claim 2 further comprising:
a top clock coupled to a top portion of the gates, wherein the top portion of the gates is located between the blocking gate and the top end; and
a bottom clock coupled to a bottom portion of the gates, wherein the bottom portion of the gates are located between the blocking gate and the bottom end.

4. The charge coupled device of claim 3, wherein the top clock operates differently than the bottom clock.

5. The charge coupled device of claim 1, wherein the column further comprises an imaging section, and wherein the imaging section defines the used section.

6. The charge coupled device of claim 1, wherein the column omits any implanted barrier gate.

7. The charge coupled device of claim 1, wherein a second of the plurality of blocking gates is configured to define the blocked state in an instance in which the one of the plurality of blocking gates also defines the blocked state.

8. The charge coupled device of claim 7 further comprising a blooming drain between the one of the plurality of blocking gates and the second of the plurality of blocking gates.

9. The charge coupled device of claim 7 further comprises circuitry configured to operate the column to execute time delay and integration mode imaging.

10. A method for directing the flow of electrical charges, comprising:
operating one of a plurality of blocking gates at a voltage potential substantially the same as a voltage potential of at least one non-blocking gate of a column of stages to divide the column of stages into a used portion and an unused portion, wherein each blocking gate is configured to selectively promote charge blocking in a blocked state or promote charge transfer in an unblocked state, wherein the column of stages defines a top end and a bottom end, wherein a top readout register is coupled to the top end of the column of stages, and wherein a bottom readout register is coupled to the bottom end of the column of stages; and
removing photogenerated electrical charges from the unused portion by a blooming drain.

11. The method of claim 10 further comprising causing an imaging flow of electrical charges to flow away from the blocking gate.

12. The method of claim 10 further comprising causing photogenerated charges in the unused portion to flow away from the blocking gate.

13. The method of claim 10, wherein operating the blocking gate at the voltage potential substantially the same as the voltage potential of the non-blocking gate of the column comprises causing use of the same voltage supply for a blocking clock voltage used to operate the used portion.

14. The method of claim 10 further comprising causing the photogenerated electrical charges to be channeled to an electrically attractive node.

15. The method of claim 10, wherein removing photogenerated electrical charges from the unused portion by the blooming drain comprises removing photogenerated electrical charges from one of a top blooming drain or a bottom blooming drain, wherein the top blooming drain is located between the top end of the column of stages and the top readout register, and wherein the bottom blooming drain is located between the bottom end of the column of stages and the bottom readout register.

16. A computer program product comprising a non-transitory computer readable storage medium having computer program code stored thereon, the computer program code being configured to, when executed, direct an apparatus to execute instructions for:
 operating one of a plurality of blocking gates at a voltage potential substantially the same as a voltage potential of at least one non-blocking gate of a column of stages to divide the column of stages into a used portion and an unused portion, wherein each blocking gate is configured to selectively promote charge blocking in a blocked state or promote charge transfer in an unblocked state, wherein the column of stages defines a top end and a bottom end, wherein a top readout register is coupled to the top end of the column of stages, and wherein a bottom readout register is coupled to the bottom end of the column of stages; and
 removing photogenerated electrical charges from the unused portion by a blooming drain.

17. The computer program product of claim 16, wherein the instructions for operating the blocking gate at the voltage potential substantially the same as the voltage potential of a non-blocking gate of the column comprises instructions for causing use of the same voltage supply for a blocking clock voltage used to operate the used portion.

18. The computer program product of claim 16, further comprising instructions for causing the photogenerated electrical charges to be channeled to an electrically attractive node.

19. The computer program product of claim 16, wherein removing photogenerated electrical charges from the unused portion by the blooming drain comprises removing photogenerated electrical charges from one of a top blooming drain or a bottom blooming drain, wherein the top blooming drain is located between the top end of the column of stages and the top readout register, and wherein the bottom blooming drain is located between the bottom end of the column of stages and the bottom readout register.

20. A charge coupled device comprising:
 at least one first array element that is adapted to block a flow of photogenerated charges in a blocked state from an unused section of a column of stages from entering a used section of the column of stages in response to maintaining a voltage potential, wherein the first array element is configured to selectively facilitate the flow of imaging charges in an unblocked state and block the flow of photogenerated charges in the blocked state;
 a second array element that is adapted to facilitate the flow of imaging charges in the used section while operating at the voltage potential, wherein the first array element is disposed adjacent to the second array element;
 a top readout register coupled to a top end of the column of stages; and
 a bottom readout register coupled to a bottom end of the column of stages.

21. The charge coupled device of claim 20 further comprising a third array element with barrier gates and a blooming drain adapted to attract the photogenerated charges.

22. The charge coupled device of claim 21, wherein the third array element is disposed adjacent the first array element.

23. The charge coupled device of claim 22 further comprising circuitry configured to execute time delay and integration mode imaging.

24. The charge couple device of claim 20 further comprising:
 a top blooming drain located between the top end of the column of stages and the top readout register; and
 a bottom blooming drain located between the bottom end of the column of stages and the bottom readout register.

* * * * *